Dec. 1, 1964   J. W. ANDERSON   3,158,890
WINDSHIELD WIPER BLADE ASSEMBLY
Filed Nov. 6, 1959

INVENTOR.
JOHN W. ANDERSON
BY
ATTORNEYS

# United States Patent Office 3,158,890
Patented Dec. 1, 1964

3,158,890
WINDSHIELD WIPER BLADE ASSEMBLY
John W. Anderson, 495 S. Huntington St., Gary, Ind.
Filed Nov. 6, 1959, Ser. No. 851,382
3 Claims. (Cl. 15—250.42)

This invention relates to windshield wiper blades and pressure-applying assemblies therefor adapted to wipe in an improved manner curved and "wrap-around" windshields, and to wipe likewise so-called flat windshields which are not truly flat but have at their surfaces irregularities making it difficult to wipe them uniformly with the conventional blade having the rubber wiping element mounted in a rigid channel.

This application is a continuation-in-part of my co-pending application Serial No. 760,391, filed September 11, 1958, and now issued as U.S. Patent No. 2,920,336.

In addition to the problems of wiping irregularities in the surface of a windshield and in wiping moderately curved windshields, the modern type of sharply curved "wrap-around" windshield, now original equipment on most new automobiles, has intensified the problem of so applying pressure to the blade as to cause the blade to remain throughout its length in effective wiping contact with the glass as it travels across a predetermined area of the windshield. Such wrap-around windshields have given rise to serious difficulties encountered in holding the outer end of the blade in effective wiping contact with the glass as it enters the outer limit of its stroke, where the most abrupt curvature of the windshield is encountered.

Various devices have been employed without success to solve the problem. Among these devices are some which have modified as to detail, without departing from the broad and novel concept, the construction shown and claimed, for examples, in my U.S. Patent No. 2,596,063 issued May 6, 1952, and in my U.S. Patent No. 2,782,448 issued February 26, 1957.

Many modifications of my patented construction often have fallen short of the desirable result above described and because of such modifications have introduced one or another new problem relating to holding the wiping edge of the blade, throughout its length, in effective wiping contact against the glass. Thereby undesirable performance characteristics are encountered in circumstances and conditions frequently found in highway travel—including various intensities and directions of air currents, and variations in their angle of impact against the windshield and the wiper blade, such air currents frequently being composites of natural wind and of currents generated by the movement of the vehicles.

One of the problems encountered in attempts to improve effectiveness of wiping contact has been to so divide and distribute, throughout the length of the blade, the pressure applied by the wiper arm, as to assure that the outer end of the blade will have maximum ability to conform to the outer and sharper curvatures of the windshield, while holding the blade in effective contact also throughout all its other portions. One form of the subject invention solves this problem by applying to the blade at predetermined points thereon such portions of the total of the arm pressure as may be determined to be desirable and by precurving the blade convexly to provide, against the windshield, throughout the length of the blade, a distribution of pressure predetermined as desirable.

Another serious problem encountered in wiping windshields is chattering of the blade as it encounters areas of varying degrees of frictional resistance in moving across the glass, particularly when the glass is in what is known as "wet-dry" or "tacky" condition, as when precipitation affects the friction of the glass irregularly, as by drops of water spaced apart. Under such "wet-dry" conditions a wiper blade often jumps, squeaks, and chatters in its contact with the glass, producing ridges of water obstructive to vision.

As I discovered in my development of the wiper blade shown in my U.S. Patent No. 2,596,063, above mentioned, and as shown also in others of my later patents, there must be provided, remote from the extremities of the blade, abutments to resist both lateral and torsional flexing of the blade. Among the means by which these two results were achieved in my U.S. Patent No. 2,596,063, above mentioned, is the slidable, flexor-embracing abutment means shown in FIGURE 11 of said patent and described in column 6, lines 25 to 33, inclusive, thereof.

In view of the problems here discussed, the present invention contemplates the provision of structure adapted to stabilize the blade against lateral and torsional deflection, while being completely free, except for a minimum of incidental friction, to move in a plane substantially perpendicular to the windshield. Thus, while the abutments of the art stabilize the blade and at the same time transmit pressure thereto, the structure of the present invention, while stabilizing the blade, does not transmit pressure to the latter, but floats freely and reversely in said plane.

While the prior art provides for abutment claws or embracing slides, the structure of the present invention provides, with said claws or slides, additional structure carrying the claws and cooperating with a pressure-transmitting member and the blade. Such additional structure may constitute links joining the pressure-transmitting member and the blade and arranged to pivot and/or slide with respect to either. My invention in one preferred form thus provides pivoting and/or sliding stabilizing links, substantially friction-free, having portions embracing and abutting the outer edges of the flexor and also a portion of the top and bottom faces thereof. Consequently, the problems of providing the abutment means necessary for reasons described are met satisfactorily without interference with my improved distribution of pressure from the wiper arm through the wiping edge of the blade to the windshield.

Thus, according to the present invention, the blade is carried by an arm pressure-transmitting means together with partially floating stabilizing means operatively connected with the pressure-transmitting means and with the blade, and being free to move, with relation thereto, in a plane substantially perpendicular to the windshield, responsive to movements of the blade with relation to the pressure-transmitting means.

While the stabilizing means herein shown is particularly advantageous with the blade, pressure-applying means, and precurved blade structure herein shown, it is to be understood that the inventive concept residing in the use and application of the free-floating stabilizing means employed in the subject invention is readily applicable to a windshield wiper in which medial portions of the blade are of sufficient length, in themselves, to make stabilization against chattering and torsional distortion desirable, in forms other than the forms herein specifically illustrated. In blades of extreme length it may be desirable to introduce secondary yokes providing one pressure point against the blade adjacent each of the blade extremities with the opposite pressure point of each individual yoke disposed somewhat remote from the extremity of the blade, thus leaving an intermediate span or spans of blade of sufficient length to utilize to advantage stabilizers such as herein shown and claimed. In other words, the inventive concept reflected in the use of such stabilizers is not limited to any particular pressure-applying structure but is useful wherever there exists a portion of the blade which requires stabilization.

A measure of the improved performances thus achieved may be obtained with structure embodying deviations from the preferred form and functions disclosed herein, such, for example, as connecting the stabilizer links with the rubber element of the blade without direct connection to the flexor. However, in the preferred form of the subject invention, as explained above, this result is obtained by a simple sliding, flexor-embracing formation carried by an end of the link (or stabilizer).

One of the advantages of certain forms of the subject invention is that it permits, throughout a major portion of the length of the blade, attainment, within practical limits, of substantially any distribution of pressure which may be predetermined as desirable. This is accomplished by means of varying the degree of precurvature of portions of the flexor in a direction toward the windshield, so that predetermined portions of the total arm pressure will be effectively applied with relation to portions of the blade, with remaining portions of the arm pressure producing effective contact of the blade against the glass at predetermined points on the blades. Because in certain forms of the subject invention there may be no arm pressure applied against the blade throughout a major longitudinal portion thereof, such a portion of the blade is left free to assert reactive pressure caused by its precurvature and thus to seek and reach, throughout its length, its own full contact with the windshield, as it traverses the constantly changing curvatures of the windshield.

Summarizing, the construction and arrangement of the invention shown and claimed in my U.S. Patent No. 2,596,063 meets fully and satisfactorily the requirements of wiping more effectively the so-called curved windshields incorporated in new cars before the advent, a few years ago, of the more sharply curved wrap-around windshield. The wrap-around windshield has introduced a new problem solved herein by certain forms of my invention by limiting the application of arm pressure to points at or adjacent the extremities of the blade, with the blade convexly precurved as herein shown—in order to provide a predetermined devision of that pressure across portions of the blade between the two extremities. In one form, this is achieved by a pressure-transmitting member operatively connected to or adjacent each such extremity with a convexly precurved blade stabilized for relative movement in a single plane substantially normal to the windshield.

While it is important that there be provided, in a device of the class described, a substantially smoothly continuous conformation by it to a surface to be wiped, it is also important that the over-all pressure applied by the wiper arm be divided and applied to the blade assembly at points thereon predetermined as desirable to give the various portions of the blade the pressure necessary to provide such continuous conformity to the windshield.

There are in service today, of comparatively recent manufacture, large numbers of automobiles having windshields the lateral extremities of which, apparently largely for styling purposes, are more abruptly curved than in any windshield previously encountered in the market. Wiper blades heretofore found in the art and encountered in practice have not been sufficiently responsive to these more extreme curvatures to permit them to conform, throughout their entire length, substantially smoothly and continuously.

In the subject invention there is provided a novel and highly effective articulated structure by which to achieve satisfactory wiping of the windshield throughout the entire area of the intended normal wipe pattern through which the blade travels. The state of the practiced art is such that engineers for vehicle manufacturers have expressed great concern about their inability to provide a full, continuous, and satisfactory wipe on wrap-around windshields on cars presently in production.

By applying approximately half of the available arm pressure at the very extremity of the blade, satisfactory conformity at that extremity can be achieved. However, it has been determined that, while such a construction is satisfactory for a substantial percentage of the designs of curved and wrap-around windshields, it does present a closely related problem in that, under such conditions, there may not be sufficient resistance to "wind lift" of the midportions of the blade, so that an unsatisfactory wipe is encountered at times at or about such midportions. Through the introduction of a substantially shorter secondary bridge or yoke, to receive at its midsection the pressure from the arm at the outer end of the blade, which passes across the more severely curved wrap-around portion of the windshield, not only does the blade wipe the full pattern of its travel but enough of the arm pressure is applied at the inner end of the shorter bridge to assist the blade to wipe satisfactorily throughout its entire length. Blades constructed in accordance with the instant invention have been operated successfully in the rain at speeds at which all previously known structures, under similar conditions, have failed.

In the instant invention the inclusion of a stabilizing member prevents irregular performance of the blade which would otherwise occur because of the increase in length of the middle span of the blade resulting from the shortening of the outer secondary bridge or yoke.

It is also important that the introduction of the stabilizer provides, between the stabilizer and the adjacent extremity of the longer bridge or yoke, the particular length of medial portion that is normal for the length of the blade. This conformity in dimensions is important because it makes applicable to blades made according to the instant invention all refills made for similar blades without the instant invention included. This simplifies resellers' stocking and reduces his investment in inventory. It also simplifies service to the car owner. At the same time it prevents confusion in such inventories that would tend to delay necessary renewing of the blade, for a safe, clean wipe, a delay not contributing to public safety.

This novel construction and arrangement of parts of a windshield wiper assembly has produced surprisingly superior results on wrap-around windshields—particularly in the matter of maintaining the entire length of the wiper element of the blade in more effective contact with the glass throughout the entire area to be wiped.

The foregoing and other objects and advantages will manifest themselves as this description progresses, reference being made therein to the accompanying drawings, wherein.

Figure 1:
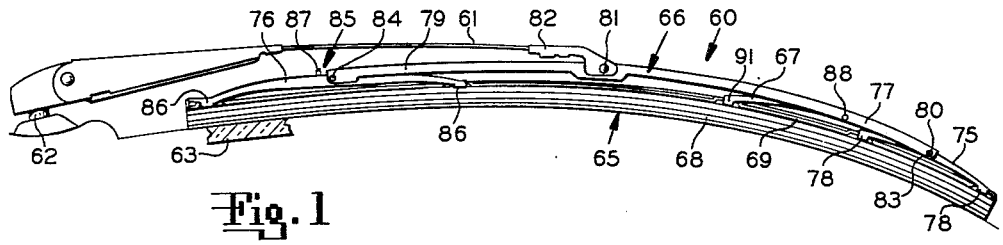
FIGURE 1 is an elevational view showing a preferred form of my invention as applied to a windshield.
Figure 2:
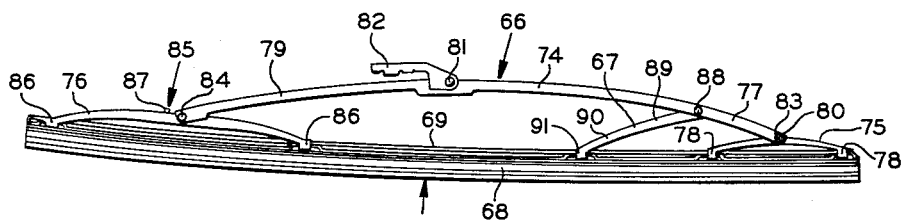
FIGURE 2 is an elevational view of the wiper blade assembly shown in FIGURE 1 removed from the windshield.
Figure 3:
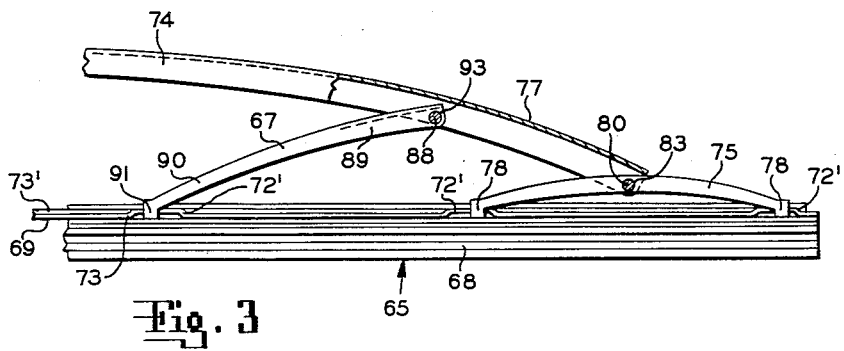
FIGURE 3 is a partial, enlarged elevational view, with parts broken away, of one end portion of the assembly of FIGURE 2.
Figure 4:
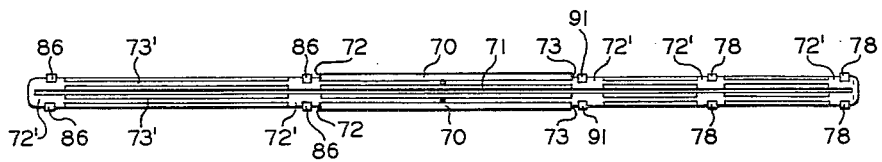
FIGURE 4 is a bottom view of the backing strip or flexor of FIGURE 1 together with the underengaging sliding claws at the ends of the pressure-transmitting means and stabilizing links.

A preferred form of my invention is shown in FIGURES 1–4 wherein a windshield wiper blade assembly 60 is shown connected to a wiper arm 61 carried by a pivot shaft 62 which is mounted along the edge portion of a windshield 63 of a motor vehicle. The wiper blade assembly 60 comprises a wiper means or blade 65, a pressure-transmitting or pressure-applying means 66, and stabilizing means or link 67. The wiper arm 61 is spring urged or biased in the direction of the windshield 63 so as to urge the wiper means 65 of the wiper blade assembly into conforming relationship with respect to the surface of the windshield 63.

The wiper means or blade 65 has a resilient wiping element 68 and a flexible backing means or flexor 69 associated therewith substantially as described with respect to the wiper means 11 of FIGURES 1–8 of applicant's U.S. Patent No. 2,920,336. In particular, the flexor 69 has laterally disposed portions 70 extending outwardly from the central portion 71 of the flexor so as to form abutments 72 and 73 on the respective ends of said portion 71 which abutments face in the direction of the ends of the blade. The flexor 69, as illustrated, has longitudinally spaced-apart raised or offset portions 72' formed therein (FIGURES 3, 4) for a purpose to be more fully described hereinafter. Formed between said longitudinally spaced-apart offset portions 72' of the flexor or locking strip 69 are longitudinally extending stiffening ribs 73' of the type shown and described in my copending application Serial No. 218,896 filed August 23, 1962. The pressure-transmitting means 66 is composed of a bridge member 74 and a pair of secondary yoke members 75 and 76 pivotally connected to the opposite ends of said bridge 74.

The bridge member 74 is an elongate moderately curved preferably channel-shaped member formed of metal or the like and having its respective end portions 77, 79 formed with aligned apertures 80 in the opposite sides thereof. An intermediate portion of the pressure-transmitting means 66 is apertured to receive a pin 81 for securing a connector 82 to said pressure-transmitting means 66. As illustrated, the pin 81 for connecting the connector 82 to the wiper blade assembly actually passes through the bridge member 74 at a point closer to the end portion 79 than to the end portion 77; however, said pin 81 is approximately midway between the ends of the wiper blade assembly when the wiper blade 65 and pressure-transmitting means 66 are assembled. The outer end portion 77 of the bridge 74 is connected to the secondary yoke member 75 by means of a pin 83.

The secondary yoke 75 is relatively short as compared to yoke 76 and in the illustrated form is approximately one-half the length of said yoke 76. The secondary yoke 75 is channel-shaped in cross section and has its opposite end portions arcuately curved in cross section and formed with spaced-apart claws 78 which are shaped to slidingly embrace the longitudinally extending edge portions of the offset portions 72' of the flexor 69. The one pair of claws 78 on the yoke 75 slidingly engage the wiper blade 65 near the outer extremity of the blade 65 with the other pair of claws 78 slidingly engaging in the illustrated form approximately midway between the outer end of the blade and the abutments 73 on the flexor 69.

The inner end portion 79 of the bridge member 74 is provided with a pin 84 which is adapted to cooperate with a latching mechanism 85 carried by the midportion of the secondary yoke member 76. Each end portion of said yoke member 76 is arcuately curved in cross section and is formed with a pair of spaced-apart claws 86 which are shaped to slidingly embrace the longitudinally extending edge portions of the offset portions 72' of the flexor 69. The one pair of claws 86 of the secondary yoke 75 is disposed in relatively close proximity to the abutments 72 formed on the central portion of the flexor 69 and the other pair of claws 86 is positioned near the extremity of the wiper blade 65. The latching mechanism 85 is provided on the secondary yoke 76 for pivotally fastening and unfastening said yoke 76 from the end portion 79 of the bridge member 74. The latch mechanism 85 can be of the general type covered in by U.S. Patent No. 2,897,530 issued on August 4, 1959.

As set out in said patent, downward pressure on a release button 87 releases the secondary yoke 76 from the pin 84 on the bridge member 74 whereby the secondary yoke 76 can be slid longitudinally relative to the wiper blade 65. The balance of the pressure-transmitting means 66 can be removed by longitudinal relative movement with respect to the wiper blade 65 in a direction opposite to the direction of movement of the yoke 76.

Spaced inwardly from the pin 83 through the end portion 77 of the bridge member is the stabilizing means or link 67. Said stabilizing link 67 is pivotally carried on the bridge member 74 by a pin 88 passing through both one end portion 89 of the link and through said bridge member. The link member extends from the bridge toward the central portion of the blade with the other end portion 90 substantially arcuately shaped in cross section and having a pair of spaced-apart claws 91 thereon which are adapted to slidingly embrace the longitudinal side edges of the offset portions 72' of the flexor 69 in close proximity to the abutments 73 formed on the intermediate portion 71 of the flexor 69. The end portion 89 of the stabilizing link 67 disposed within the confines of the channel-shaped bridge 74 is provided with a portion 93 overhanging the pivot pin 88 so that the edge of said portion 93 engages with the inner surface of the bridge member 74 for limiting outward movement of the stabilizing link 67 relative to the bridge beyond a predetermined amount.

The stabilizing link 67 functions in much the same manner as the stabilizing links 13, 13a described with respect to FIGURES 1–8 in U.S. Patent 2,920,336. That is, due to the nature of the pivot pin connection between the end portion 89 of the link 67 and the portion 77 of the bridge member 74, the stabilizing link 67 is free to move only in plane containing the longitudinal axes of the pressure-transmitting means 66, the stabilizing link 67 and the wiper blade 65. The stabilizing link 67 has free, unimpeded, unobstructed movement relative to the bridge member 74 in said plane containing said axes of the pressure-transmitting means, link and wiper blade. The other end portion 90 of the link 67 has claws 91 slidably embracing the offset portions 72' of said flexor 69 of the wiper blade 65 which, in combination with the pivoted end 89 of said link 67, stabilize the central portion of the flexor 69 and wiper blade 65 against lateral distortion, chatter, and torsional deflection and deformation.

The flexor 69 has the offset portions 72' formed therein in such a way that the respective claws 86, 91 and 78 when operatively engaged therewith serve to space the underportions of the claws in such a way as to, among other things, prevent scratching of the surface of the windshield by said claws.

The blade assembly 60 of FIGURES 1–4 is particularly constructed and arranged for use on all types of windshields whether flat (within the context of the term as well-known in the windshield wiper art), moderately curved, or wrap-around. The blade performs in a highly superior and improved manner on the wrap-around portions of a wrap-around windshield, conforming throughout its length to the surface being wiped. The pressure-transmitting member 66 transmits arm pressure to the two secondary yokes 75, 76 which in turn apply the pressure to the flexor 69 and wiper element 68 for conforming the wiping edge of the wiper blade to the surface of the windshield. The yoke 76 distributes the pressure transmitted to it by the bridge 74 through the relatively widely separated claws 86 to the flexor 69 and wiper element. Since the inner end portion of the wiper blade traverses and wipes relatively flat or moderately curved portions of the windshield surface, the relatively widely separated distribution of pressure to the flexor and wiper blade is adequate to produce a satisfactory wipe throughout that portion of the blade.

The yoke 75 being relatively short distributes the pressure transmitted to it by the bridge 74 through the relatively closely spaced claws 78 to the flexor 69 and wiper element. Since the outer end portion of the wiper blade is traversing, at least during a portion of its wipe pattern, a relatively abruptly curved surface of a windshield, the application of pressure from the yoke 75 to relatively closely spaced points on the flexor of the wiper blade near the extremity of the wiper blade forces a conformity of the blade to the surface of the windshield.

The space from the centrepost pair of claws 78 of the yoke 75 to the centremost pair of claws 86 of the yoke 76 is relatively long and is, therefore, subject to twisting, chatter and the like, all of which detract from the efficiency of the wipe of the blade assembly. By providing the substantially pressurefree, floating, unimpeded stabilizing link 67 between the bridge 74 and the wiping blade 65, the span between said claws 78 and 86 is supported against chatter, distortion, deflection and deformation without the introduction of pressure at the point of connection between said stabilizing link 67 and said wiper blade 65. In this way the pressure from the wiper arm 61 is most effectively used to urge the wiping edge of the wiper blade 65 into conformity with the varying curvatures of the windshield surface while the stabilizing link 67 is provided to stabilize the intermediate portions of the blade to produce an improved and complete wipe pattern on the surface of the windshield.

Having thus described my invention, it is obvious that various modifications may be made in the same without departing from the spirit of the invention; and, therefore, I do not wish to be understood as limiting myself to the exact forms, constructions, arrangements and combinations of parts herein shown and described.

I claim:

1. A wiper for cleaning a nonplanar surface comprising a wiper blade having a resilient wiping element and a flexible backing means, pressure-transmitting means operatively connected with said wiper blade and comprising a bridge member having an inboard end portion and an outboard end portion, a secondary yoke member pivotally attached on the inboard end portion of said bridge member, another secondary yoke member considerably shorter than said first-named secondary yoke member and being pivotally attached on the outboard end portion of said bridge member, each of said secondary yoke members having pairs of spaced-apart claws slidably engaging with the backing means of said wiper blade at a plurality of longitudinally spaced points, pressurefree unimpeded stabilizing means operatively connected with said bridge member and with said wiper blade, said stabilizing means having one end pivotally connected with said bridge member adjacent the pivotal connection of the shorter secondary yoke and having its other end directed toward and slidably engaging with an intermediate portion of said backing means, said stabilizing means being free to move in a plane common to the longitudinal axes of said pressure-transmitting means and said wiper blade whereby said intermediate portion of the backing means and wiper blade is stabilized against lateral vibration and chatter and against torsional deformation and distortion.

2. A wiper for cleaning a nonplanar surface comprising a wiper blade having a resilient wiper element and a flexible backing means, pressure-transmitting means operatively connected with said wiper blade comprising a bridge member having an inboard end portion and an outboard end portion, a secondary yoke member pivotally attached on the inboard end portion of said bridge member, latch means for detachably securing said secondary yoke to said inboard end portion of said bridge member, another secondary yoke member shorter in length than said first-named secondary yoke member and being pivotally attached on the outboard end portion of said bridge member, said respective secondary yoke members slidably engaging with said wiper blade at a plurality of longitudinally spaced points, and pressurefree unimpeded stabilizing means interposed between said bridge member and said wiper blade, said stabilizing means having one of its extremities pivotally carried on said bridge member adjacent the pivotal connection of the shorter secondary yoke and being directed from said pivotal connection toward a midportion of said wiper blade and being freely movable with relation to said bridge member in a plane common to the axes of said pressure-transmitting means and said wiper blade, said stabilizing means having its other extremity slidably engaging with said wiper blade at a portion between the respective slidably engaging secondary yoke members, whereby said stabilizing means stabilizes said portion of said wiper blade against lateral vibration and chatter and against torsional deformation and distortion.

3. A wiper for cleaning a nonplanar surface comprising a wiper blade having a resilient wiping element and a flexible backing means, pressure-transmitting means operatively connected with said wiper blade and comprising a bridge member having an inboard and an outboard end portion, a secondary yoke member pivotally attached on the inboard end portion of said bridge member, said secondary yoke member having means slidably engaging one end portion of said backing means at longitudinally spaced points, another secondary yoke member considerably shorter than said first-named secondary yoke member and being pivotally attached on the outboard end portion of said bridge member, said last-named secondary yoke member having means slidably engaging with the other end portion of said backing means of said wiper blade at relatively closely spaced points, pressure-free unimpeded stabilizing means operatively connected with said bridge member adjacent the outboard end and said pivotal connection between said bridge and said another secondary yoke and with said wiper blade, said stabilizing means having one end pivotally connected with said bridge member and having its other end slidably engaging with an intermediate portion of said backing means spaced inwardly along the wiper blade from the last-named secondary yoke member, said stabilizing means being free to move only in a plane common to the longitudinal axes of said pressure-transmitting means and said wiper blade whereby said intermediate portion of the backing means and wiper blade is stabilized against lateral vibration and chatter and against torsional deformation and distortion.

References Cited in the file of this patent

UNITED STATES PATENTS

| | | |
|---|---|---|
| 2,888,702 | Sussex | June 2, 1959 |
| 2,897,530 | Anderson | Aug. 4, 1959 |
| 2,920,336 | Anderson | Jan. 12, 1960 |

FOREIGN PATENTS

| | | |
|---|---|---|
| 1,213,331 | France | Oct. 26, 1959 |